United States Patent [19]

Bouma

[11] Patent Number: 4,558,883
[45] Date of Patent: Dec. 17, 1985

[54] HITCH ASSEMBLY

[75] Inventor: James R. Bouma, Foreston, Minn.

[73] Assignees: Herbert F. Dalglish, St. Paul; George D. Weitgenant, Dayton, both of Minn. ; part interest to each

[21] Appl. No.: 576,873

[22] Filed: Feb. 3, 1984

[51] Int. Cl.[4] .............................................. B60D 7/02
[52] U.S. Cl. ................................ 280/478 A; 280/482
[58] Field of Search .......... 280/478 R, 478 A, 478 B, 280/477, 482, 479 R, 495, 433

[56] References Cited

U.S. PATENT DOCUMENTS

| | | | |
|---|---|---|---|
| 2,366,295 | 1/1945 | Stringer | 280/477 |
| 2,464,424 | 3/1949 | Weldon et al. | 280/477 |
| 2,703,243 | 3/1955 | Clark | 280/478 B X |
| 3,612,576 | 10/1971 | Marker | 280/478 B |
| 3,649,048 | 3/1972 | Garnett | 280/477 |
| 3,801,137 | 4/1974 | Zucca | 280/477 X |
| 3,912,119 | 10/1975 | Hill et al. | 280/478 A |
| 3,929,237 | 12/1975 | Schaedler | 280/478 A |
| 3,989,270 | 11/1976 | Henderson | 280/478 A |
| 4,069,885 | 1/1978 | Gego et al. | 280/477 X |
| 4,176,854 | 12/1979 | Hill et al. | 280/478 R |
| 4,284,291 | 8/1981 | Morlok et al. | 280/479 R |
| 4,350,362 | 9/1982 | Landers | 280/478 A |

*Primary Examiner*—Joseph F. Peters, Jr.
*Assistant Examiner*—Charles R. Watts
*Attorney, Agent, or Firm*—Burd, Bartz & Gutenkauf

[57] ABSTRACT

A hitch assembly for hitching a trailer vehicle and a tow vehicle. A latch assembly is mounted on one vehicle and a guide unit is mounted rearward of the latch assembly. A drawbar has a forward end portion releasably connectable to the latch assembly. The drawbar extends rearward in operative relationship to the guide unit. The guide unit includes guide plates with trailing edge sections in rearwardly diverging arcuate relationship forming a rearwardly open fan-shaped mouth. The rearward end of the drawbar carries coupling apparatus to connect with corresponding apparatus on the trailer. A drawbar guide roller assembly is mounted at an intermediate location on the drawbar. The rearwardly divergent edges of the guide unit are forwardly convergent to a U-shaped pocket. The guide roller assembly is located on the drawbar to be positioned in the pocket when the forward end of the drawbar is fixed in the latch assembly to arrest horizontal movement. Upon release of the forward end of the drawbar from the latch assembly, it can be moved rearwardly and swung horizontally so as to locate the rearward end at an exact position for coupling to a trailer tongue. Once coupled, the drawbar is moved forward with respect to the tow vehicle so that the forward end moves toward the latch position. As the drawbar moves forward, the divergent edges of the guide unit cooperate with the guide roller assembly on the drawbar to centrally locate and align the drawbar until it reaches the latch position.

54 Claims, 16 Drawing Figures

HITCH ASSEMBLY

BACKGROUND OF THE INVENTION

The present invention relates to a hitch assembly usable to couple a trailer vehicle and a tow vehicle, such as a pick-up truck, four-wheel drive vehicle, farm tractor, automobile or the like. Normally in the procedure of coupling a tow vehicle to a trailer, the tow vehicle is backed into close proximity to the trailer hitch. If the trailer is light, there is no difficulty in moving the trailer hitch to the tow vehicle. However, if the tongue weight exerted by the trailer is heavy, as is often the case, the tow hitch must be moved into close proximity with the trailer hitch. This is inconvenient, unsafe and time consuming, often done with two persons, one driving the tow vehicle and the other guiding the first.

SUMMARY OF THE INVENTION

According to the present invention, there is provided a hitch assembly to facilitate coupling or hitching of a tow vehicle and a trailer or towed vehicle of the type including not only conventional-wheeled vehicles but nonwheeled equipment such as certain farm implements. Attachment of the hitch assembly is described with respect to a tow vehicle, although the hitch assembly could be attached to the towed vehicle or equipment as well. The hitch assembly includes a latch assembly mounted on the tow vehicle and a guide unit mounted rearward of the latch assembly. A drawbar has a forward end portion releasably connectable to the latch assembly. The drawbar extends rearward in operative relationship to the guide unit. The guide unit includes one or two guide plates with trailing edge sections in rearwardly diverging arcuate relationship forming a rearwardly open fan-shaped mouth. The rearward end of the drawbar carries coupling apparatus to connect with corresponding apparatus on the trailer. A drawbar guide roller assembly is mounted at an intermediate location on the drawbar. The rearwardly divergent edges of the guide unit are forwardly convergent to a U-shaped pocket. The guide roller assembly is located on the drawbar to be seated in the pocket when the forward end of the drawbar is fixed in the latch assembly to arrest horizontal movement. Upon release of the forward end of the drawbar from the latch assembly, it can be moved rearwardly and swung horizontally so as to locate the rearward end at an exact position for coupling to a trailer tongue. Once coupled, the drawbar is moved forward with respect to the tow vehicle so that the forward end moves toward the latch position. This is accomplished either by backing of the tow vehicle or through the use of a power unit connected between the tow vehicle and the drawbar. As the drawbar moves forward with respect to the tow vehicle, the divergent edges of the guide unit cooperate with the guide roller assembly on the drawbar to centrally locate and align the drawbar. When the forward end of the drawbar moves to the latch position, the guide roller has seated in the pocket of the guide unit. The coupling procedure is easily and quickly accomplished by a single person.

DESCRIPTION OF PREFERRED EMBODIMENTS

Figures 1, 2:
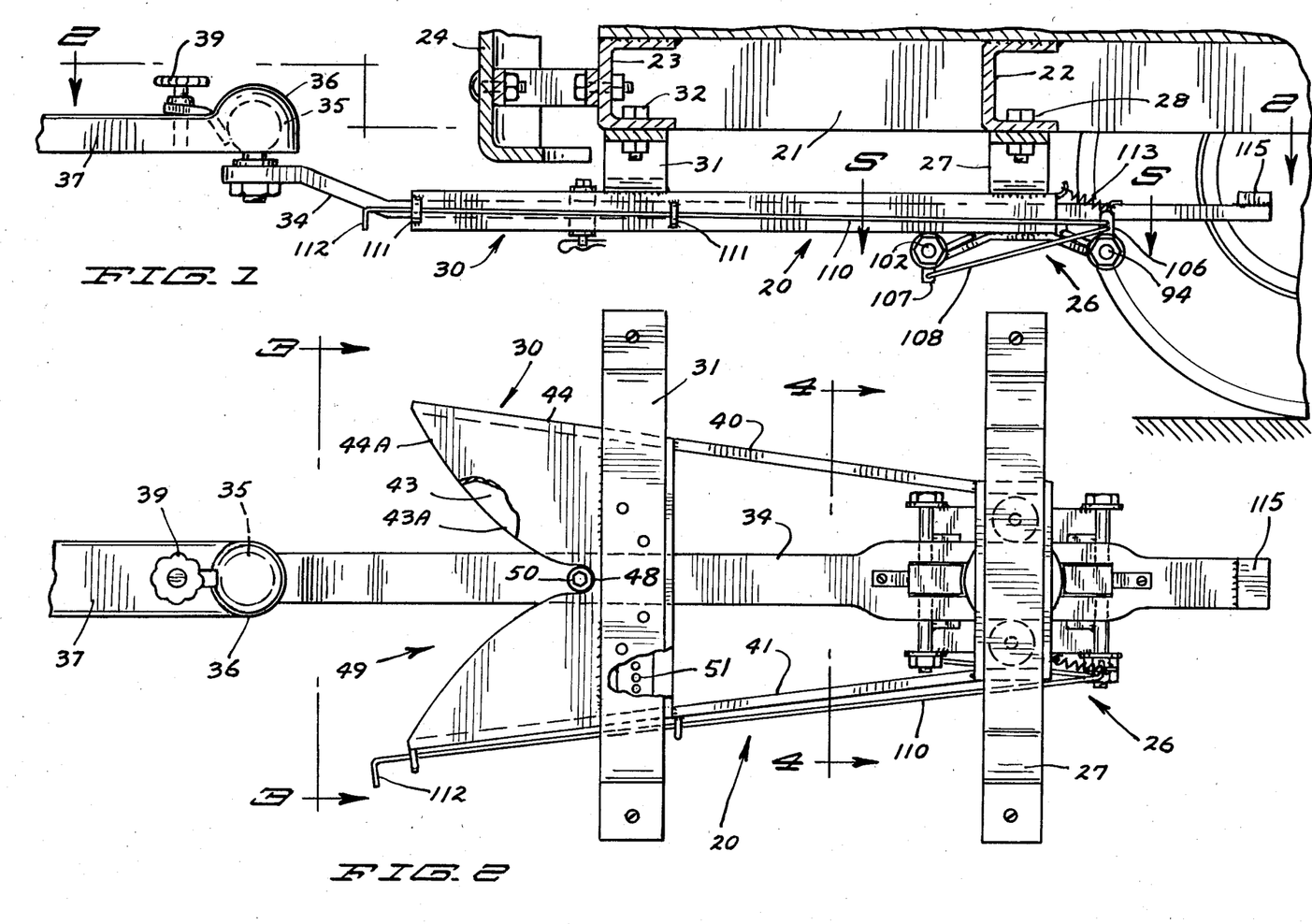
FIG. 1 is a side elevational view with portions in section of a hitch assembly according to a first form of the invention installed on a tow vehicle and connected to a trailer hitch.
FIG. 2 is a top plan view of the hitch assembly of FIG. 1 taken along the line 2—2 thereof.

Referring to the drawings, there is shown in FIGS. 1 and 2 a hitch assembly indicated generally at 20 mounted rearwardly on a tow vehicle 21 which has transverse frame members 22, 23 and a rear bumper 24. A forward portion of hitch assembly 20 is comprised as a latch assembly 20 fixed to transverse frame member 22 by U-shaped mounting bracket 27 and nut and bolt assemblies 28. A rearward portion of hitch assembly 20 is comprised as a guide unit 30 secured in longitudinal alignment with latch assembly 26 to rearward transverse frame member 23 by U-shaped mounting bracket 31 and nut and bolt assemblies 32. Latch assembly 26 and guide unit 30 are connected by first and second frame members 40, 41. A hardened alloy steel drawbar 34 is assembled with respect to latch assembly 26 and guide unit 30. The forward end of drawbar 34 is releasably fixed with respect to latch assembly 26 in the configuration shown in FIGS. 1 and 2. An intermediate portion of drawbar 34 extends through guide unit 30, and the extreme rearward end of drawbar 34 carries a coupling means shown to include a ball 35 of the ball-and-socket-type coupling hitch. Trailer hitch socket 36 connected to trailer tongue 37 engages the ball 35 and is releasably retained thereon by locking mechanism 39 as is well known in the art. Trailer tongue 37 is connected to a trailer (not shown) to be towed by vehicle 21.

Drawbar 34 is a flat, elongate member with a rectangular cross section and an upwardly offset rearward end for mounting of hitch ball 35. Alternatively, the end of drawbar 34 could be downwardly offset or straight. The forward end of drawbar 34 is releasable by latch assembly 26 to permit rearward movement of drawbar 34 and horizontal swing of the drawbar in order to exactly locate the coupling end of the drawbar with respect to a trailer hitch. Upon accomplishing the coupling procedure, guide unit 30 serves to properly direct drawbar 34 toward the latched position.

Figure 3:
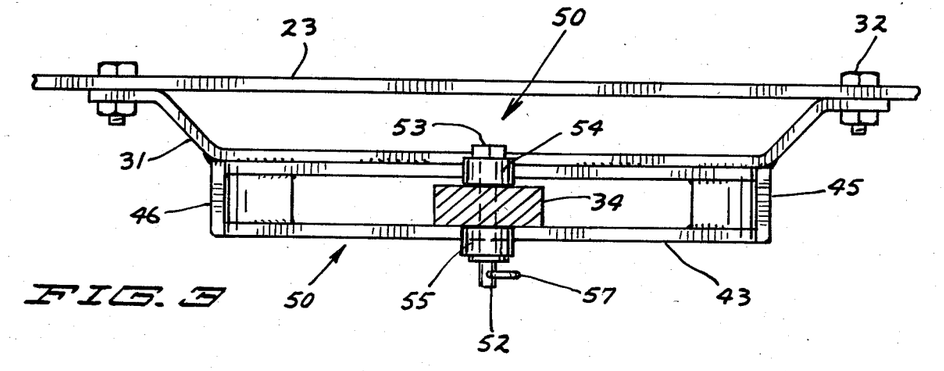
FIG. 3 is an enlarged sectional view of a portion of the hitch assembly of FIG. 2 taken along the line 3—3 thereof.

As shown in FIGS. 1 through 3, guide unit 30 has lower and upper horizontal, parallel spaced apart guide plates 43, 44 connected by upright first and second side walls 45, 46 forming a longitudinally open housing. The side walls can be slightly forwardly convergent as shown and connect with frame members 40, 41. The rear or trailing edges of guide plates 43, 44 are specifically contoured or shaped to guide drawbar 34 from an outwardly extended position toward and to the fully latched position. Drawbar 34 extends between the lower and upper guide plates 43, 44. As shown in FIG. 2, the trailing edges 43A of lower guide plate 43 and 44A of upper guide plate 44 are identical in configuration. Centrally on guide plates 43, 44, the trailing edges 43A, 44A have parallel portions and end portions forming a central, rearwardly open U-shaped pocket 48. From pocket 48, each edge 43A, 44A extends in opposite arcuate sections in outwardly and rearwardly diverging relationship. The sections extend to the rearward ends of the side walls 45, 46 forming a rearwardly open funnel or fan-shaped mouth 49. Mouth 49 has an opening delineated by the distance between the ends of the side walls 45, 46. Forwardly convergent sections of the trailing edges 43A, 44A terminate at pocket 48 for purposes of guiding the drawbar to the latched position.

Figure 8:
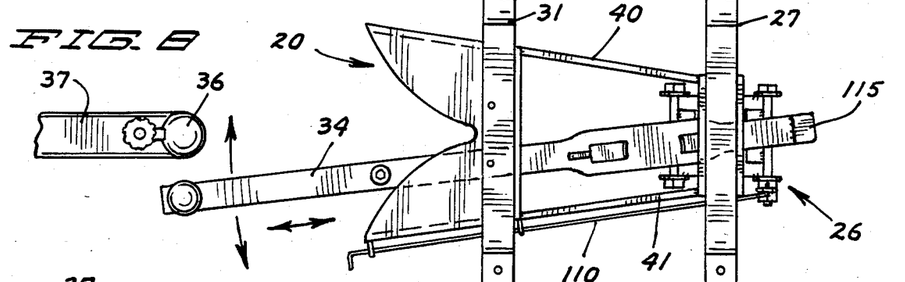
FIG. 8 is a reduced top plan view of the hitch assembly of FIG. 2 showing the drawbar in a released position.

Drawbar 34 is equipped with a removable drawbar guide roller assembly 50 for cooperation with the edges defining mouth 49. As shown in FIG. 3, guide roller assembly 50 includes a guide roller pin having a shank 52 extended through a suitable opening in drawbar 34, and an upper cap 53. An upper roller 54 is rotatably assembled about shank 52 on the upper surface of drawbar 34, and a lower roller 55 is rotatably assembled on shank 52 beneath drawbar 34. A fastener 57 disposed on the bottom of shank 52 holds roller 55 in place. The upper and lower rollers 54, 55 can be metal rollers, plastic rollers, or other suitable material. Alternatively, the rollers 54, 55 could be comprised as sealed roller bearings. As shown in FIG. 2, guide roller assembly 50 is positioned on drawbar 34 at an intermediate location thereof such that it is seated in the pocket 48 when the forward end of drawbar 34 is fixably assembled in the latch assembly 26. Upon release of the forward end of drawbar 34 from latch assembly 26, drawbar 34 is extendible rearwardly with roller assembly 50 being displaced from pocket 48. The drawbar can be moved in and out and swung horizontally to properly position the coupling end thereof as shown in FIG. 8. To return the drawbar 34 to the latched position, it is moved in a forward direction relative to latch assembly 26 and guide unit 30. Trailing edges 43A, 44A of guide plates 43, 44 serve to guide the roller assembly 50 toward pocket 48 until it reaches a point where it is properly seated therein and the forward end of drawbar 34 latches in latch assembly 26. To facilitate movement of drawbar 34, the upper forward surface of lower guide plate 43 can carry a ball bearing plate 51, as shown in FIG. 2. Alternatively, a low friction surface such as a Teflon-coated plate could be provided.

Figure 4:
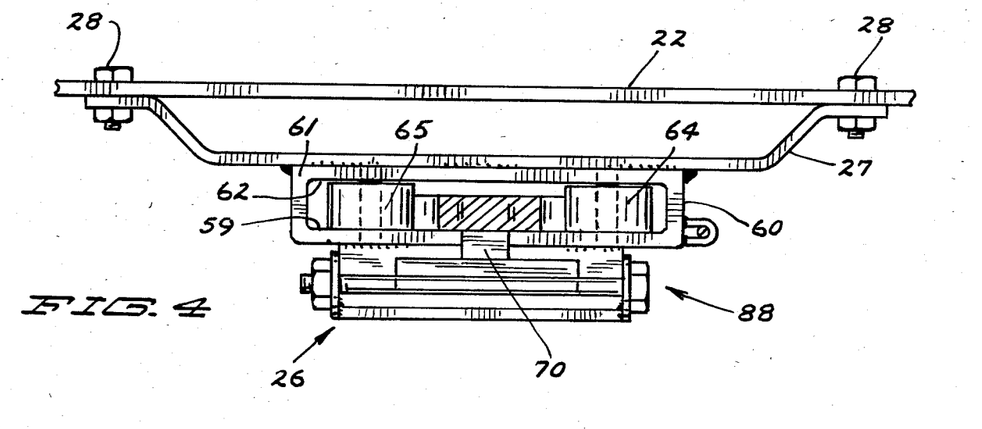
FIG. 4 is an enlarged sectional view of a portion of the hitch assembly of FIG. 2 taken along the line 4—4 thereof.
Figures 5, 9:
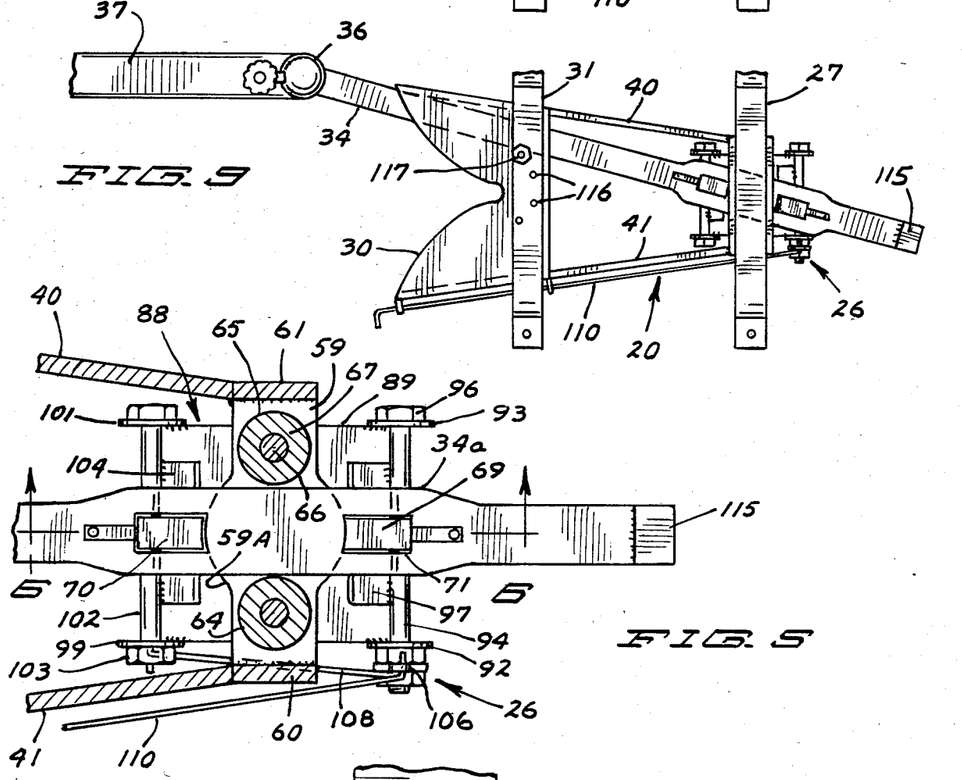
FIG. 5 is an enlarged sectional view of a portion of the hitch assembly of FIG. 1 taken along the line 5—5 thereof.
FIG. 9 is a reduced top plan view of the hitch assembly of FIG. 2 showing the drawbar locked in an off-center tow position.

Latch assembly 26 includes a rectangular open frame comprised of a lower transverse horizontal latch plate 59, first and second vertical side walls 60, 61 extended from lateral ends of latch plate 59, and a top member or wall 62 parallel to latch plate 59 (see FIGS. 4 and 5). Side walls 60, 61 connect with frame members 41, 40 respectively. The midportion of latch plate 59 is longitudinally enlarged to provide arcuate leading and trailing latch edges indicated at 59A in FIG. 5. First and second latch guide roller assemblies 64, 65 are mounted between latch plate 59 and top wall 62. Roller assemblies 64, 65 are symmetrically positioned in spaced apart relationship with respect to latch plate 59 to straddle drawbar 34. Each roller assembly includes an upright roller shaft 66 mounted between the latch plate 59 and top wall 62, and a cylindrical rotatable roller portion 67. Roller portion 67 can be comprised of a single roller or alternatively, sealed roller bearings. As shown, the roller assemblies are stationary, but one of them could be spring-loaded as will be described.

Forward portion 34A of drawbar 34 that fits in latch assembly 26 is laterally widened for purposes of strength as shown in FIG. 5. The latching portion 34A carries connecting means including forward and rearward pivoted, longitudinally spaced apart drop-down latch blocks 69, 70. Forward latch block 69 is generally rectangular in top and bottom configuration and is pivotally mounted in a rectangular latch block opening 71 in drawbar 34 shown in FIG. 6. An oil-hardened latch block pivot pin 72 extends transversely across latch block opening 71 and is accommodated in an oversize pivot pin opening 74 in latch block 69. Pivot opening 74 of latch block 69 is forwardly offset with respect to the center of block 69 whereby block 69 is eccentrically mounted and has a tendency to pivot downwardly in a rearward direction under the influence of gravity. Block 69 is pivotal between the drop-down position shown in FIG. 6 and the horizontal or retracted position of FIG. 7.

Figure 6:
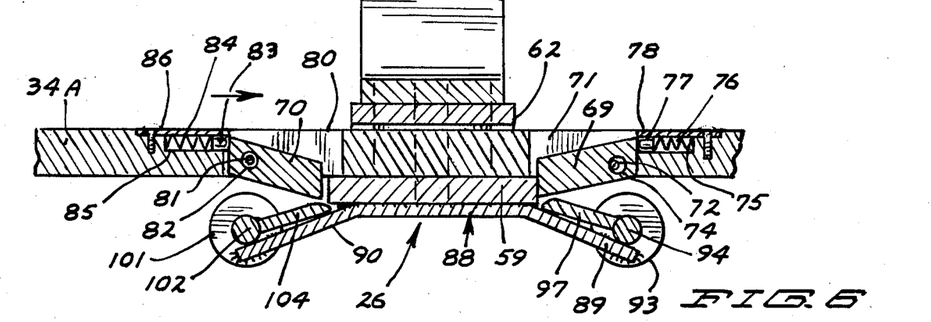
FIG. 6 is a sectional view of the portion of the hitch assembly shown in FIG. 5 taken along the line 6—6 thereof.
Figures 7, 11:
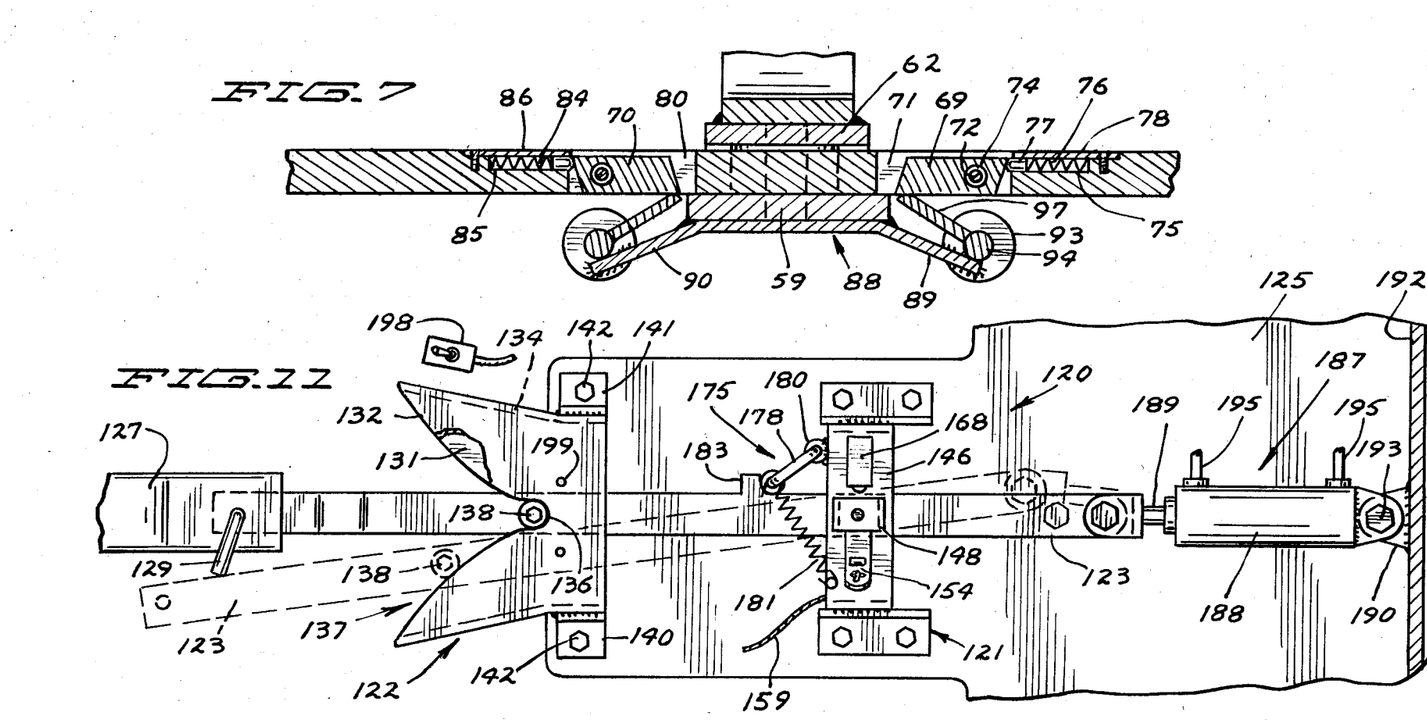
FIG. 7 is a sectional view of the latch assembly of the hitch assembly like that of FIG. 6 but showing the latch assembly moved to the release position.
FIG. 11 is a top plan view of a hitch assembly according to a second form of the invention.

The front and rear sides of block 69 are beveled having a forward-upward inclination with block 69 in the horizontal position of FIG. 7, and a vertical orientation in the drop-down position of FIG. 6. Block 69 has a parallelogram cross-sectional shape. A compression spring assembly is provided to bias the latch block 69 in the drop-down position of FIG. 6. A shallow groove 75 extends forwardly from the latch block opening 71 on the upper surface of drawbar 34. A compression spring 76 is set in groove 75 and bears against a small rod 77 which in turn bears against the upper portion of the forward side of block 69 tending to pivot it downwardly. A recessed cover 78 is provided to cover and retain the spring 76 and rod 77.

Rearward drop-down latch block 70 is mounted symmetrically to forward block 69 in a rearward latch block opening 80 formed in drawbar 34. An oil-hardened pivot pin 81 extends transversely across opening 80 and is accommodated in an oversize pivot opening 82 in latch block 70. Pivot opening 82 is located rearwardly of center to eccentrically mount latch block 70 with a tendency to pivot downwardly in a forward direction under the influence of gravity. Latch block 70 is pivotal between the drop-down position shown in FIG. 6 and the retracted or horizontal position shown in FIG. 7. The forward and rearward sides of latch block 70 are beveled so as to be rearwardly-upwardly inclined in the horizontal position, and vertically orientated in the drop-down position of FIG. 6, presenting a parallelogram cross section. A compression spring assembly 84 and small rod 83 are located in a shallow groove 85 set rearwardly of latch opening 80 and covered by a recessed cover 86 to bias the rearward latch block 70 in the drop-down position as previously described.

The confronting sides of the forward and rearward latch blocks (i.e. the rearward side of the forward block 69 and the forward side of the rearward block 70) are spaced apart a distance roughly equal to, but slightly greater than, the central width or diameter of latch plate 59. The confronting sides of the latch blocks are curved as shown in FIG. 5 to conform to the arcuate curvature at 59A of latch plate 59.

In the configuration shown in FIGS. 5 and 6, drawbar 34 is latched or locked with respect to latch assembly 26 and accordingly, vehicle 21. The central portion of drawbar 34A located between latch block openings 71, 80 rests on the upper surface of latch plate 59 constrained from upward movement by top wall 62. Forward and rearward latch blocks 69, 70 are in the drop-down position in straddling relationship to forward and rearward arcuate edges 59A of latch plate 59. The oversize pivot opening 74 in forward latch block 69 permits latch block 69 to bear between the forward edge of latch plate 59 and the forward edge of latch opening 71. In like fashion, the oversize pivot opening 82 in the rearward latch block 70 permits rearward latch block 70 to bear between the rearward side or rearward latch opening 80 and the rearward bearing edge 59A of latch plate 59. Drawbar 34 is constrained from back and forth movement with respect to latch plate 59. Gravity tends to hold the latch blocks 69, 70 in this latched position. Spring assemblies 76, 84 further influence the latch blocks to maintain the latched position.

A release mechanism is provided with latch assembly 26 to move latch blocks 69, 70 from the drop-down and locked position of FIG. 6 to the level, release position of FIG. 7. In the release position of FIG. 7, the latch blocks 69, 70 are retracted into the drawbar 34 and are horizontal or level with respect to drawbar 34 so that it can slide over latch plate 59 to a position free of the influence of latch assembly 26. As shown in FIGS. 5 through 7, a shield and mounting plate 88 has a central portion secured, as by welding, to the lower surface of latch plate 59. A forward section 89 extends forward and downwardly from the central portion of mounting plate 88 to a location beneath forward latch block 69, and a rearward section 90 extends rearwardly and downward to a location below rearward latch block 70. First and second vertical washer-like mounting brackets 92, 93 are secured to the lateral forward edges of the forward section 89. A forward pivot rod 94 has lateral ends assembled for pivotal movement in the brackets 92, 93. Stop members 96, such as nuts, pins or the like, are secured to the ends of rod 94 extended outward from mounting brackets 92, 93 to secure the rod in place. Rod 94 carries a cam-like lift plate 97 normally poised just beneath the rearward end of forward latch block 69, as shown in FIG. 6. Pivot rod 94 is rotatable in a forward direction, or a clockwise direction as viewed in FIGS. 6 and 7, to rotate the lift plate 97. Upon such pivotal movement, the lift plate 97 engages the lower surface of forward latch block 69 and moves it upward to the retracted position shown in FIG. 7.

First and second rearward washer-like mounting brackets 99, 101 are secured to lateral rearward edges of rearward section 90 of mounting plate 88 and rotatably carry end portions of a rear pivot rod 102. Stop members 103 are connected to the outer ends of pivot rod 102 beyond the mounting brackets 99, 101 to secure it in place. Pivot rod 102 carries a lift plate 104 having an outer end normally disposed beneath the forward end of rear latch block 70, as shown in FIG. 6. Rotation of the rear pivot rod 102 in a rearward direction, or a counterclockwise direction, as viewed in FIGS. 6 and 7, is effective to move lift plate 104 upward to a position in contact with the forward portion of rear latch block 70, and thereupon to move the rear latch block 70 toward the retracted position of FIG. 7.

Alternatively to the mounting shown, forward mounting brackets 92, 93 and rear mounting brackets 99, 101 could be mounted to side frame members 40, 41, carrying the respective pivot rods.

A linkage assembly is provided for simultaneous counterrotation of pivot rods 94, 102 to lift latch blocks 69, 70 for release of drawbar 34. As shown in FIG. 1, a lever arm 106 extends upwardly from pivot rod 94. A second lever arm 107 extends downwardly from the rearward pivot rod 102. A pivot rod connecting link 108 connects the outer ends of the first and second levers 106, 107. Rotation of the pivot rod 94 in a forward direction to raise lift plate 97 is effective to pull the pivot rod connecting link 108 resulting in rearward rotation of the second pivot rod 102 and the lifting of the rearward lift plate 104.

One end of a control link 110 is secured to the lever arm 106 of pivot rod 94. Control link 110 extends horizontally along the side frame member 41 and can be supported by various eye mounts 111. Control linkage 110 terminates rearwardly at a handle 112 located proximate the end of guide unit 30 and readily accessible by a person. The handle 112 is pushed in order to rotate the pivot rods 94, 102 in a direction to actuate lift plates 97, 104. A tension spring 113 is disposed between the lever arm 106 and side wall 60 of latch assembly 26. The tension spring 113 biases the pivot rod 94 in a rearward rotational direction or in a direction to normally maintain the lift plates 97, 104 out of the way. Control linkage 110 could alternatively extend inward or inside of frame member 41 for purposes of protection.

In use, in the procedure of coupling hitch assembly 20 to a trailer, handle 112 of control linkage 110 is pushed to elevate lift plates 97, 104 and retract latch blocks 69, 70 into drawbar 34. Drawbar 34 can be moved to the position of FIG. 8. It can be moved inward and outwardly and swung horizontally in order to exactly position the ball 35 or other hitch element with respect to a trailer hitch. A safety stop member 115 welded on the extreme forward end of drawbar 34 is effective to limit outward movement of drawbar 34 by intercepting top wall 62 of latch assembly 26. Once the drawbar is coupled to the trailer hitch, it is moved relative to latch assembly 26 and guide unit 30 to the latched position. Generally this is accomplished by backing or rearward movement of the tow vehicle 21. In so doing, drawbar guide roller assembly 50 guides the drawbar with respect to guide unit 30 to the latched position. In moving to the latched position, the forward latch block 69 rides over the latch plate 59. The forward edge of the rearward latch block 70 intercepts the side of the latch plate 59 just at the point where forward latch block 69 has traveled across it and also drops into position in engagement with the latch plate. At this point, guide roller assembly 50 is seated in pocket 48 on guide unit 30 to arrest horizontal swing of drawbar 34.

Figure 10:
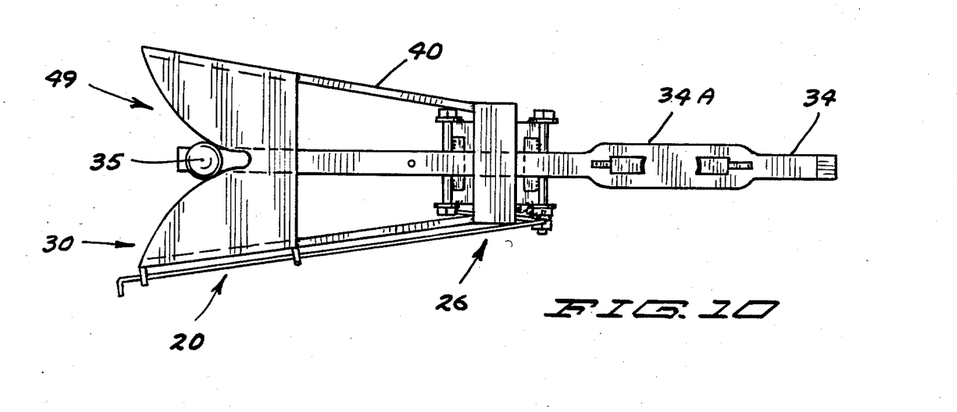
FIG. 10 is a reduced top plan view of the hitch assembly of FIG. 2 with the mounting brackets removed and showing the drawbar in a retracted out-of-the-way position.

At such time as drawbar 34 will not be in use, it can be moved to an out-of-the-way position, as shown in FIG. 10. The guide roller assembly 50 is removed by removal of fastener 57 and then lifting out the shank 52 of the locking pin. Upon actuation of control linkage 110, the drawbar 34 is released and can be moved forwardly as shown in FIG. 10 to an out-of-the-way position. It can be secured in such position by suitable means, such as an elastic O-ring.

A further use of the hitch assembly 20 is shown in FIG. 9 where the latch bar guide roller assembly 50 has been removed. A plurality of mounting holes 116 extend downwardly through the mounting bracket and upper and lower guide plates of guide unit 30. With the guide roller assembly removed, the drawbar can be horizontally swung back and forth, and in particular, to a position as shown in FIG. 9 with the forward end of the drawbar latched in latch assembly 26. Rotation is facilitated by the arcuate curved portion of the latch plate 59 and the corresponding curved edges of the forward and rearward latch blocks 69, 70. Drop pin or pins 117 are inserted through corresponding mounting holes 116 adjacent the drawbar 34. The drawbar is thus held in one of a choice of offset positions for offset towing purposes.

As shown in FIGS. 3 and 4, mounting brackets 27, 31 mount the latch assembly 26 and guide unit 30 to tow vehicle frame members 22, 23 respectively. The U-shaped mounting brackets 27, 31 have horizontal end portions which receive the nut and bolt assemblies 28, 32. It will be understood that the mounting brackets, method and location can vary appreciably according to the vehicle type and the structural members available for mounting the hitch assembly, and the mounting method shown is only by way of example. It will be further understood that the hitch assembly can be mounted on the towed vehicle instead of the towing vehicle, and the references to forward and rearward direction are used for orientation with respect to the hitch assembly and not necessarily to designate the direction of travel of the tow and towed vehicles.

Referring to FIGS. 11 through 16, there is shown a hitch assembly according to a second form of the invention indicated generally at 120 and having a latch assembly 121 forwardly spaced from a guide unit 122, both carrying a hardened alloy steel drawbar 123. Hitch assembly 120 is for heavier duty work as, for example, farm work or heavy industrial, and can be mounted on the upper surface of the mounting plate 125 of a farm tractor. Alternatively, the hitch assembly could be mounted beneath the mounting plate of the tractor or on other suitable tractor structure, such as the transmission housing, transfer case or the like, dependent upon the availability of mounting structure, the desired location of the hitch assembly and other such considerations.

A forward portion of drawbar 123 is releasably fixed to latch assembly 121. An intermediate portion extends through guide unit 122, and the extreme rearward end of drawbar 123 carries coupling means for connection to a hitch of trailing equipment. As shown, the end of drawbar 123 is upwardly offset and fits between bifurcated ends 126 of a tongue 127 of trailing equipment (not shown). The shank of a hitch pin 129 is inserted through aligned hitch openings on the ends 126 of tongue 127 and drawbar 123.

Guide unit 122 is alike in construction to the guide unit 30 earlier described with respect to first hitch assembly 20. Guide unit 122 has lower and upper parallel spaced apart guide plates 131, 132 connected by side walls 133, 134. The trailing edges of guide plates 131, 132 centrally define a pocket 136. From pocket 136, each trailing edge extends in opposite arcuate sections, in outwardly and rearwardly diverging relationship forming a rearwardly open funnel or fan-shaped mouth 137. A guide roller assembly 138 is mounted on drawbar 123 and is positioned to be seated in the pocket 136 when the forward portion of drawbar 123 is fixed with respect to latch assembly 121. Guide unit 122 is fixed to mounting plate 125 by L-shaped mounting brackets 140, 141, which have vertical legs fixed to side walls 133, 134 by suitable means, such as welding, and horizontal legs fixed to mounting plate 125 by nut and bolt assemblies 142.

Figures 13, 14, 15, 16:
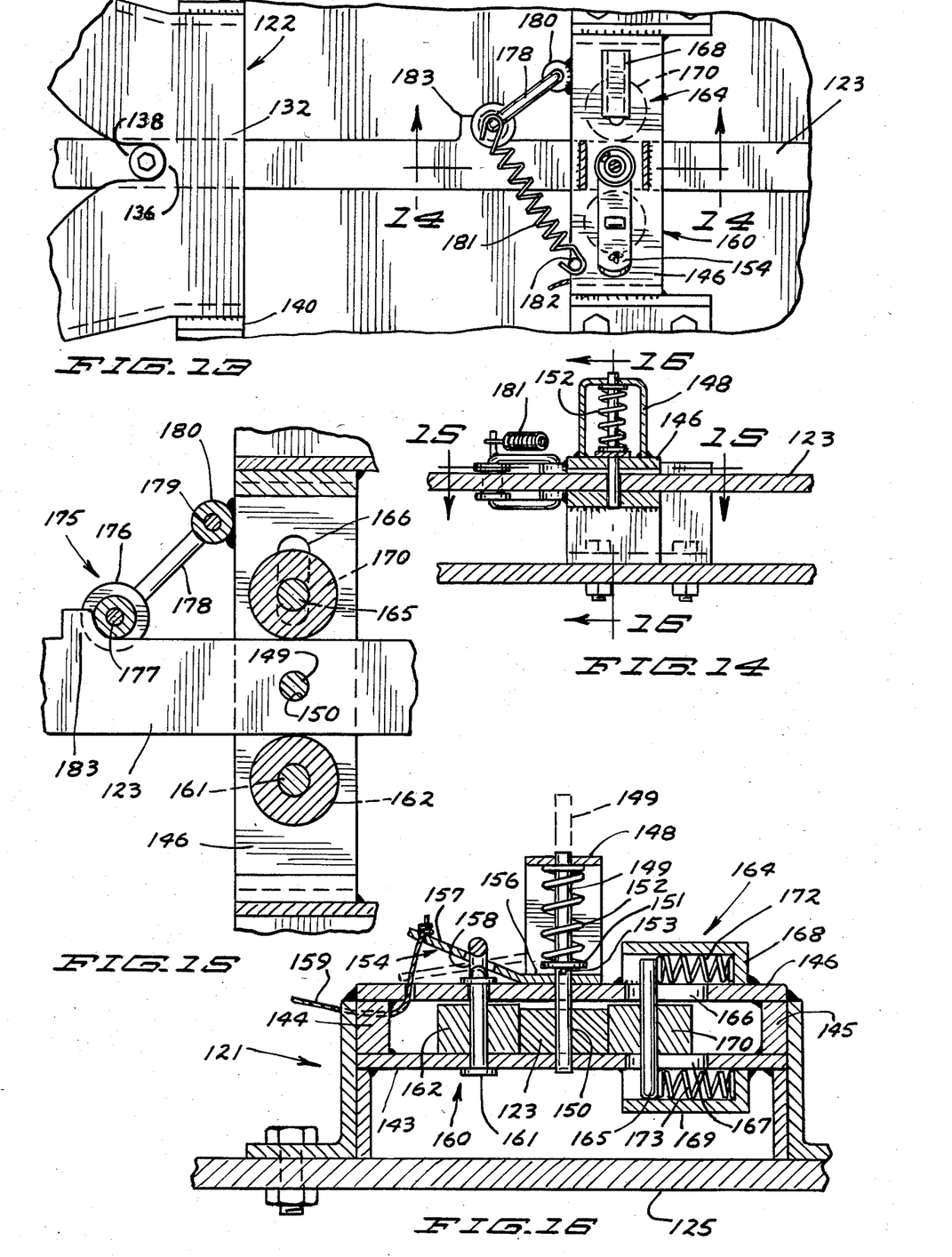
FIG. 13 is an enlarged sectional view of a portion of the latch mechanism of the hitch assembly of FIG. 12 taken along the line 13—13 thereof.
FIG. 14 is an enlarged sectional view of a portion of the latch assembly of the hitch assembly of FIG. 13 taken along the line 14—14 thereof.
FIG. 15 is an enlarged sectional view of a portion of the latch assembly of FIG. 14 taken along the line 15—15 thereof.
FIG. 16 is an enlarged sectional view of a portion of the latch assembly of FIG. 14 taken along the line 16—16 thereof.

Latch assembly 121 includes a rectangular open frame formed by a lower horizontal latch plate 143, first and second vertical side walls 144, 145 and a horizontal top wall 146 (see FIG. 16). An inverted U-shaped housing is secured to the upper surface of top wall 146 and carries a spring-loaded, hardened latch pin 149. The lower end of latch pin 149 extends through an opening in top wall 146, a latch opening 150 in drawbar 123, and a corresponding opening in the latch plate 143. A compression spring 152 surrounds the portion of latch pin 149 located within housing 148. The upper end of compression spring 152 bears against the upper wall of the U-shaped housing 148. The lower end bears against washer 151 positioned above a transverse stop member 153 extended diametrically through latch pin 149.

A latch pin release lever 154 has a flat, horizontal leg 156 positioned beneath the transverse stop member 153 and resting on the surface of top wall 146 in surrounding relationship to latch pin 149. A lever arm 157 extends angularly upward and outward from leg 156 over a fulcrum 158. Depression of the outer end of lever arm 157 of lever 154 is effective to move leg 156 upwardly against transverse stop member 153 and move latch pin 149 upwardly through a top opening in housing 148 against the bias of spring 152. The lower end of latch pin 149 is moved clear of drawbar 123 so that it can slide in and out of latch assembly 121. Depression of lever arm 157 can be accomplished manually or through the use of a cable assembly. One end of control cable assembly 159 is fixed to the outer end of lever arm 157. The other end extends to a remote location for convenient access by the operator and is fixed to a pull mechanism such as an hydraulic actuator or lever mechanism. Such a control could conveniently be located proximate the guide unit 122.

A pair of latch guide roller assemblies are positioned in latch assembly 121 to be in straddling relationship to drawbar 123 as it is inserted in the latch assembly 121 towards the latched or fixed position. A stationary roller assembly 160 includes a pivot shaft 161 secured between the upper and lower latch assembly walls 146, 143. A roller 162 is rotatably mounted about the pivot shaft 161. A second, spring-loaded latch guide roller assembly 164 includes a pivot shaft 165 extended between the lower and upper walls 143, 146 with ends extended through slots 166, 167 provided therein. The upper end of pivot shaft 165 extends into an upper spring housing 168, and the lower end extends to a lower spring housing 169. A roller 170 is disposed rotatably about the pivot shaft 165. An upper compression spring 172 is located in upper spring housing 168 and bears inwardly against the upper end of pivot shaft 165. A lower compression spring 173 is located in the lower spring housing 169 and bears against the lower end of the pivot shaft 165 to bias the roller 170 in an inward direction or in a direction tending to bring the lateral sides of drawbar 123 in contact with the sides of the rollers and properly align it for engagement of latch opening 150 with latch pin 149.

A side roller assembly 175 cooperates with spring-loaded roller assembly 164 to guide drawbar 123 to proper latching position with respect to latch assembly 121 when a particularly large amount of draft is present due to heavy equipment or under uneven terrain conditions. A grooved roller 176 is rotatably mounted on a roller shaft 177 which swings on roller shaft arms 178 connected to a pivot shaft 179. Pivot shaft 179 is located in a pivot sleeve 180, which is fixed to rearward edges of upper wall 146 and latch plate 143. A tension spring 181 extends from an outwardly extended end of roller shaft 177 and an anchor 182. Tension spring 181 holds roller 176 in contact with the edge of drawbar 123 adjacent spring-loaded roller assembly 164 as it is being positioned in latch assembly 121. Drawbar 123 has an outwardly extended shoulder 183. Shoulder 183 is located on drawbar 123 such that it will come in contact with the roller 176 just when the drawbar latch hole 150 reaches a vicinity to be engaged by the drawbar latch pin 149. The drawbar 123 is inserted between the guide rollers 162, 170, with the lower end of latch pin 149 riding the upper surface of drawbar 123. At such point as the roller 176 intercepts the shoulder 183, drawbar 123 is pivoted about the roller 176 until latch pin opening 150 is located beneath latch pin 149 which is moved into pin opening 150 by spring 152.

Figure 12:
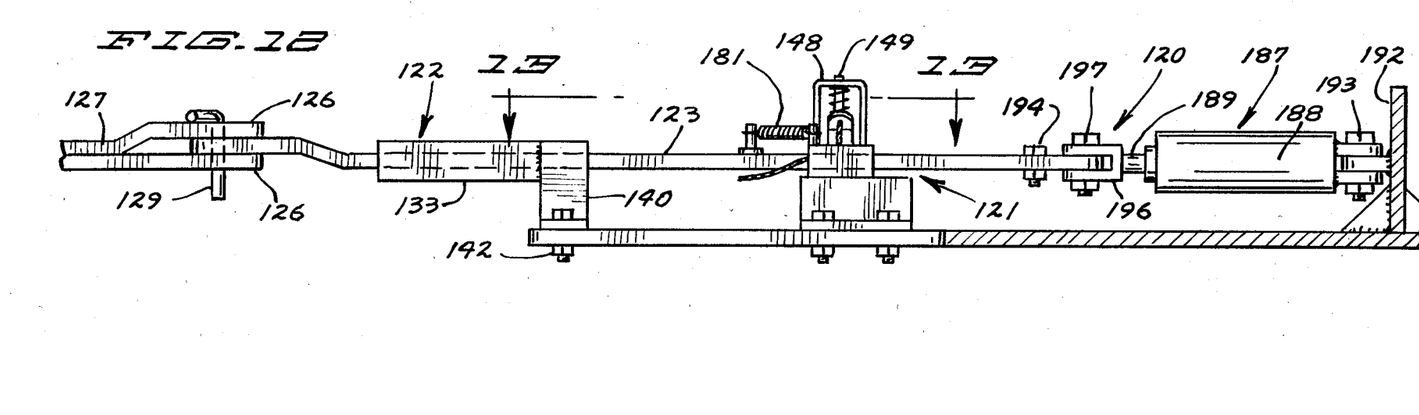
FIG. 12 is a side elevational view of the hitch assembly of FIG. 11.

As shown in FIGS. 11 and 12, a power unit 187 is provided for extending and retracting drawbar 123 to and from the latched position. Power unit 187 could be either electric or hydraulic actuated, but is shown as a hydraulic actuator having a cylinder portion 188 and an extendible and retractable rod 189. Cylinder portion 188 is pivotally connected to a lug 190 fastened to a frame member 192 by a nut and bolt assembly 193. Hydraulic fittings 195 permit flow of hydraulic fluid to move the hydraulic piston (not shown) back and forth with respect to cylinder 188 to extend and retract the rod 189. A fitting 196 on the outer end of rod 189 is bifurcated and pivotally connected to the extreme forward end of drawbar 123 by a nut and bolt assembly 197. A control 198 is provided mounted in the vicinity of the rearward end of guide unit 122. Control 198 controls the action of hydraulic power unit 187. Control 198 could also control the motion of cable 159 to depress lever 157 and lift latch pin 149. The control 198 is situated for convenient use by the hitch assembly operator. A safety stop 194 is provided on drawbar 123 just rearward of fitting 196 in case of accidental disengagement with rod 189.

In the use of hitch assembly 120, with drawbar 123 uncoupled, it is released from the latch assembly 121 and moved rearward. Release from the latch assembly 121 is accomplished by actuating the control lever to depress lever arm 157 of lever 154 to move the latch pin 149 out of latch opening 150 of drawbar 123, thus freeing it to move rearwardly. Control 198 is operated to extend the rod 189 rearwardly from cylinder 188 to move the drawbar 123 rearwardly. In the extended position, drawbar 123 can be horizontally swung back and forth and, with control 198, moved in and out so that the extreme end thereof can be exactly located according to the equipment hitch. Upon proper location with respect to the equipment hitch, and the coupling of the end thereof, the drawbar is moved forward by operation of the power unit 187 to retract the rod 189. Drawbar guide roller assembly 138 engages the trailing edges of guide plates 131, 132 as necessary to guide the drawbar 123 along the proper path until the guide roller assembly becomes seated in the pocket 136. During this procedure, latch guide roller assemblies 160, 164 assist in proper alignment of the drawbar 123. The lower end of the now elevated latch pin 149 rides along the upper surface of the drawbar 123. When the latch opening 150 of drawbar 123 reaches the vicinity of the latch pin 149, shoulder 183 is engaged by the side roller 176. This causes whatever pivotal movement might be necessary to locate the drawbar latch pin 150 immediately beneath the elevated latch pin 149 so that it will lock into place.

As shown in FIG. 11, guide unit 122 can have a plurality of drop-pin openings 199. As previously described, the drawbar roller guide assembly 138 is removable so that drawbar 123 can be secured in an off-center position with respect to guide unit 122 for towed equipment along an off-center path.

While there has been shown and described certain preferred embodiments according to the invention, it will be apparent that certain deviations and alterations can be had therefrom without departing from the scope and spirit of the invention.

The embodiments of the invention in which an exclusive property or privilege is claimed are defined as follows:

1. A hitch assembly mounted on a first vehicle for connection to a hitch member of a second vehicle for towing of one vehicle by the other, comprising:

a guide unit mounted on said first vehicle including a guide plate having a trailing edge with a contour defining a central pocket and guide edge sections extending from the pocket in rearwardly diverging relationship forming a rearwardly open fan-shaped mouth;

a latch assembly mounted in longitudinal alignment with and spaced forward of the guide unit, said latch assembly having releasable drawbar latch means;

an elongate drawbar assembled with respect to the guide unit and latch assembly, said drawbar rearwardly extendible to a movable position and forwardly retractable to a latched position, said drawbar having a forward end and a rearward end, said drawbar having connecting means on a forward portion for connection with the latch means of the latch assembly with the forward end extended beyond the latch assembly, and coupling means at the rearward end for coupling with a hitch member of a second vehicle;

said latch means being engageable with the connecting means of the drawbar to secure the drawbar, and releasable from the connecting means permitting the drawbar to be extendible rearwardly and movable from side to side for proper location to be coupled with a hitch member on a second vehicle;

said drawbar carrying a drawbar guide roller assembly having at least one guide roller located to be situated in the pocket of the guide plate when the connecting means is secured with respect to the latch assembly, and positioned on the drawbar for cooperation with the guide edge sections of the guide plate upon retraction of the drawbar from the extended position toward the latched position of the guide roller located in the guide plate pocket.

2. The hitch assembly of claim 1 wherein: said guide unit includes upper and lower horizontal guide plates having parallel trailing edges forming said pocket and defining said mouth, said drawbar extended between the guide plates, said drawbar guide roller assembly having upper and lower guide rollers for cooperation with the trailing edges of the upper and lower guide plates.

3. The hitch assembly of claim 1 wherein: said latch assembly includes a lower transverse latch plate having forward and rearward latch edges and a top member spaced above and parallel to the latch plate, said drawbar being slidably mounted on the latch plate, said connecting means on the drawbar including latch block means engageable with the latch plate.

4. The hitch assembly of claim 3 wherein: said connecting means includes a forward latch block opening on said drawbar and a rearward latch block opening spaced rearwardly of the forward latch block opening, a forward drop-down latch block mounted in the forward latch block opening for pivotal movement about a forward portion thereof between a retracted position with respect to the drawbar, and a downwardly pivoted position with the forward latch block having a rearwardly facing side located beneath the latch bar;

a rearward drop-down latch block pivotally mounted in the rear latch block opening for pivotal movement about a rearward portion thereof between a retracted position with respect to the drawbar and a downwardly pivoted position with a forward facing side located beneath the drawbar;

said latch blocks being spaced apart a distance, whereby confronting sides straddle the forward and rearward latch edges of the latch plate when the portion of the drawbar between the latch openings rests on the latch plate, to secure the drawbar with respect to the latch assembly; and means to lift the latch blocks from the drop-down position to the retracted position to release the drawbar.

5. The hitch assembly of claim 4 wherein: the forward and rearward latch blocks have forward and rear sides that are beveled in a direction so as to be vertical when the latch blocks are in the drop-down position and the drawbar is horizontally orientated.

6. The hitch assembly of claim 4 wherein: the forward and rearward latch blocks are mounted on forward and rearward transverse pivot pins mounted in the forward and rearward latch block openings, said forward and rearward latch blocks having oversize pivot openings for accommodation of the pivot pins.

7. The hitch assembly of claim 4 wherein: said guide unit and latch assembly are connected by side frame members.

8. The hitch assembly of claim 4 wherein: said drawbar guide roller assembly is removable, said latch plate having arcuate forward and rearward latch edges, said latch blocks having arcuate confronting faces in conformance with the latch edges of the latch plate to permit rotation of the drawbar with respect to the latch plate when in the latched position and when the drawbar guide roller assembly is removed.

9. The hitch assembly of claim 4 wherein: said drawbar has an enlarged transverse portion, said latch block openings being located on the enlarged transverse portion of the drawbar.

10. The hitch assembly of claim 4 including: first and second upright guide means on the latch block positioned to be in staddling relationship to the drawbar when the drawbar is mounted on the latch plate.

11. The hitch assembly of claim 10 wherein: each guide means on the latch plate is comprised as an upright latch guide roller assembly.

12. The hitch assembly of claim 11 wherein: one of the latch guide roller assemblies is spring-loaded.

13. The hitch assembly of claim 4 including: a stop member on the forward end of the drawbar engageable with a portion of the latch assembly to limit rearward movement of the drawbar with respect to the latch assembly.

14. The hitch assembly of claim 4 including: spring assemblies biasing the latch blocks in the drop-down position.

15. The hitch assembly of claim 4 including: a shallow groove extending on the surface of the drawbar away from each latch block opening and in a direction opposite the latch plate, a compression spring in the groove, a push rod acting on a side surface of the latch block and being pushed by the compression spring, and a recessed cover covering the groove.

16. The hitch assembly of claim 4 wherein: the means to lift the latch blocks from the drop-down position to the retracted position includes a forward transverse pivot rod carrying a forward lift plate, means pivotally mounting the forward transverse pivot rod with the forward lift plate having an end poised beneath the forward latch block in the drop-down position whereby pivotal movement of the forward pivot rod moves the lift plate end upwardly in engagement with the forward latch block to move the forward latch block to the retracted position, a rearward transverse pivot rod carrying a rearward lift plate, means pivotally mounting the rearward pivot rod with the rearward lift plate having an end poised beneath the rearward latch block in the drop-down position whereby pivotal movement of the rearward pivot rod moves the end of the lift plate upwardly in engagement with the rearward latch block to move the rearward latch block to the retracted position, and means interconnecting the forward and rearward pivot rods for simultaneous pivotal movement for upward movement of the forward and rearward lift plates.

17. The hitch assembly of claim 16 wherein: means interconnecting the pivot rods includes an upwardly extended lever arm fixed to the end of one rod, a downwardly extended lever arm fixed to the corresponding end of the other rod, a pivot rod connecting link connecting the outer ends of the lever arms so that the pivot rods counterrotate together, a control link secured to one of the arms and extended rearwardly to the vicinity of the guide unit for manual manipulation to rotate the pivot rods.

18. The hitch assembly of claim 17 including: a tension spring connected between a lever arm and a portion of the latch assembly and positioned to bias the pivot rods in position with the lift plates clear of the latch blocks in the drop-down position.

19. The hitch assembly of claim 16 including: first and second latch plate guide roller assemblies disposed on the latch plate in straddling relationship to the drawbar when the drawbar is mounted on the latch plate.

20. The hitch assembly of claim 16 wherein: the forward and rearward latch blocks have sides that are beveled in a direction to be vertical when in the drop-down position and when the drawbar is horizontally orientated, said drawbar having an enlarged transverse portion, said latch block openings being located on the enlarged transverse portion of the drawbar, said latch blocks being pivotally mounted on forward and rearward transverse pivot pins mounted in the forward and rearward latch block openings, said latch blocks having oversize pivot pin openings to accommodate the pivot pins.

21. The hitch assembly of claim 20 wherein: said guide unit includes upper and lower horizontal guide plates having parallel trailing edges forming said pocket and defining said mouth, said drawbar extended between the guide plates, said drawbar guide roller assembly having upper and lower guide rollers for cooperation with the trailing edges of the upper and lower guide plates.

22. The hitch assembly of claim 1 wherein: said latch assembly includes a longitudinally open latch frame; said drawbar having a latch opening on the forward portion thereof; a latch pin movably mounted to the latch frame, said drawbar positionable with the latch opening aligned with the latch pin for movement of the latch pin into and out of engagement with the latch opening to secure and release the drawbar.

23. The hitch assembly of claim 22 including: spring means connected between the latch pin and the latch frame to bias the latch pin in engagement with the latch opening of the drawbar.

24. The hitch assembly of claim 23 including: manually operable lever means mounted on the latch frame connected to the latch pin to move the latch pin out of engagement with the latch opening of the drawbar.

25. The hitch assembly of claim 24 including: a pair of latch guide roller assemblies mounted to the latch frame in staddling relationship to the drawbar.

26. The hitch assembly of claim 24 including: a power unit mounted between the forward end of the drawbar and the first vehicle in position to move the drawbar between an extended position and the retracted and latched position.

27. The hitch assembly of claim 22 wherein: said latch frame includes a lower latch plate and a horizontal top wall parallel to and spaced from the latch plate, said drawbar disposed between the latch plate and the top wall, said latch plate and top wall having openings positioned for alignment with the latch opening of the drawbar, said latch pin being mounted on the top wall and extendible through the top wall opening for engagement with the latch opening of the drawbar and extendible to the latch plate opening.

28. The hitch assembly of claim 27 wherein: said drawbar guide roller assembly is removable to permit horizontal movement of the rearward end of the drawbar when the forward portion is assembled in the latch assembly.

29. The hitch assembly of claim 27 including: a latch pin housing located on the top wall of the latch frame and mounting said latch pin; a compression spring bearing between the latch pin housing and the latch pin to bias the latch pin downwardly; a lever member having a first end assembled to the latch pin and a second opposite end movable to lift the first end and the latch pin against the bias of the spring to a position out of engagement with the latch opening on the drawbar.

30. The hitch assembly of claim 29 including: first and second guide roller assemblies assembled between the latch plate and the top wall in straddling relationship to the drawbar to guide the drawbar toward the latched position.

31. The hitch assembly of claim 30 wherein: one of said latch guide roller assemblies is spring-loaded.

32. The hitch assembly of claim 31 including: a side roller assembly having a side roller mounted on a pivotal arm that is fixed to the latch assembly, said side roller in engagement with the side of the drawbar adjacent the spring-loaded roller assembly, side roller spring means biasing the side roller in engagement with the drawbar, said drawbar having a transversely extended shoulder for engagement with the side roller upon retraction of the drawbar when the drawbar latch opening reaches the vicinity of the latch pin.

33. The hitch assembly of claim 32 including: a power unit mounted between the forward end of the drawbar and a portion of the first vehicle for moving the drawbar between an extended position and the retracted and latched position.

34. The hitch assembly of claim 33 wherein: said power unit is comprised as a hydraulic actuator having a cylinder portion pivotally fixed to the first vehicle and an extendible and retractable rod portion having an outer end pivotally fixed to the forward end of the drawbar.

35. The hitch assembly of claim 34 including: control means for controlling the power unit and mounted in the vicinity of the guide unit.

36. The hitch assembly of claim 34 including: a safety stop member located proximate the forward end of the drawbar and rearward of the point of connection of the rod portion of the hydraulic actuator.

37. The hitch assembly of claim 29 including: cable assembly means fixed to the second end of the lever member operable to move the second end of the lever member to lift the first end.

38. The hitch assembly of claim 3 wherein: said latch block means includes at least one pivotal latch block engageable with the latch plate.

39. The hitch assembly of claim 4 wherein: said drawbar guide roller assembly is removable to permit forward movement of the drawbar to a storage position.

40. The hitch assembly of claim 2 including: roller bearing means mounted on the upper surface of the lower guide plate to facilitate side-to-side movement of the drawbar.

41. A hitch assembly mounted on a first vehicle for connection to a hitch member on a second vehicle for towing of one vehicle by the other, comprising:
   a latch assembly mounted on said first vehicle including a lower transverse latch plate having forward and rearward latch edges, and a top member parallel to and spaced above the latch plate;
   an elongate drawbar slidably mounted on the latch plate and having a forward end and a rearward end, said rearward end carrying coupling means for coupling with a hitch member of a second vehicle;

said drawbar having connecting means on a forward portion for connection with the latch plate of the latch assembly with the forward end extended beyond the latch assembly, said connecting means being engageable with the latch plate to secure the drawbar, and releasable from the latch plate permitting the drawbar to be extendible rearwardly and movable from side to side for proper location to be coupled with a hitch member on a second vehicle, said connecting means including a forward latch block opening on said drawbar and a rearward latch block opening spaced rearwardly of the forward latch block opening, a forward pivotal latch block mounted in the forward latch block opening for pivotal movement about a forward portion thereof between a retracted position with respect to the drawbar and an outwardly pivoted position having a rearwardly facing side which is located outward of the latch bar, a rearward pivotal latch block pivotally mounted in the rear latch block opening for pivotal movement about a rearward portion thereof between a retracted position with respect to the drawbar and an outwardly pivoted position with a forward facing side which is located outward of the drawbar;

said latch blocks being spaced apart a distance whereby confronting sides straddle the forward and rearward latch edges of the latch plate in the outward position when the portion of the drawbar between the latch opening rests on the latch plate to secure the drawbar with respect to the latch assembly; and means to move the latch blocks from the outward pivoted position to the retracted position to release the drawbar.

42. The hitch assembly of claim 41 wherein: the forward and rearward latch blocks have forward and rear sides that are beveled in a direction so as to be vertical when the latch blocks are in the outward position and the drawbar is horizontally orientated.

43. The hitch assembly of claim 41 wherein: the forward and rearward latch blocks are mounted on forward and rearward transverse pivot pins mounted in the forward and rearward latch openings, said forward and rearward latch blocks having oversize pivot openings for accommodation of the pivot pins.

44. The hitch assembly of claim 41 including: a guide unit mounted on the first vehicle positioned to guide movement of the rearward end of the drawbar when the connecting means is released from the latch plate.

45. The hitch assembly of claim 43 wherein: said latch plate has arcuate forward and rearward latch edges, said latch blocks having arcuate confronting faces in conformance with the latch edges of the latch plate to facilitate rotation of the drawbar about the latch plate when in the latched position.

46. The hitch assembly of claim 45 including: first and second upright latch guide roller assemblies assembled to the latch plate positioned to be in straddling relationship to the drawbar when the drawbar is mounted on the latch plate.

47. The hitch assembly of claim 46 including: a stop member located on the forward end of the drawbar to limit rearward movement of the drawbar with respect to the latch assembly.

48. The hitch assembly of claim 47 including: spring assemblies biasing the latch blocks in the outward position.

49. The hitch assembly of claim 41 wherein: the means to move the latch blocks from the drop-down position to the retracted position includes a forward transverse pivot rod carrying a forward lift plate, means pivotally mounting the forward transverse pivot rod with the forward lift plate having an end poised outward of the forward latch block in the outward position whereby pivotal movement of the forward pivot rod moves the lift plate end upwardly in engagement with the forward latch block to move the forward latch block to the retracted position, a rearward transverse pivot rod carrying a rearward lift plate, means pivotally mounting the rearward pivot rod with the rearward lift plate having an end poised outward of the rearward latch block in the outward position whereby pivotal movement of the rearward pivot rod moves the end of the lift plate inwardly in engagement with the rearward latch block to move the rearward latch block to the retracted position, and means interconnecting the forward and rearward pivot rods for simultaneous pivotal movement for inward movement of the forward and rearward lift plates.

50. The hitch assembly of claim 49 wherein: means interconnecting the pivot rods includes an upwardly extended lever arm fixed to the end of one rod, a downwardly extended lever arm fixed to the corresponding end of the other rod, a pivot rod connecting link connecting the outer ends of the lever arms so that the pivot rods counterrotate together, a control link secured to one of the arms and extended rearwardly to the vicinity of the guide unit for manual manipulation to rotate the pivot rods.

51. A hitch assembly mounted on a first vehicle for connection to a hitch member on a second vehicle for towing of one vehicle by the other, comprising:

a latch assembly mounted on the first vehicle including a longitudinally open latch frame, and a latch pin movably mounted to the latch frame;

an elongate drawbar slidably mounted in the latch frame having a forward end and a rearward end, said rearward end carrying coupling means for coupling with a hitch member of a second vehicle;

the forward end of the drawbar being extended through and beyond the latch frame, said drawbar having a latch opening on the forward portion thereof and positionable with the latch opening aligned with the latch pin of the latch assembly for movement of the latch pin into and out of engagement with the latch opening to secure and release the drawbar;

a pair of latch guide roller assemblies mounted to the latch frame in straddling relationship to the latch bar;

said latch pin being engageable with the latch opening of the drawbar to secure the drawbar, and releasable with respect to the drawbar permitting the drawbar to be extendible rearwardly and movable from side to side for proper location to be coupled with a hitch member on a second vehicle, spring means connected between the latch pin and the latch frame to bias the latch pin in engagement with the latch opening of the drawbar; and manually operable lever means mounted on the latch frame and connected to the latch pin to move the latch pin out of engagement with the latch opening of the drawbar.

52. The hitch assembly of claim 51 including: a power unit mounted between the forward end of the drawbar and the first vehicle and positioned to move the drawbar between an extended position and the retracted and latched position.

53. The hitch assembly of claim 52 wherein: said latch frame includes a lower latch plate and a horizontal top wall parallel to and spaced from the latch plate, said drawbar disposed between the latch plate and the top wall, said latch plate and top wall having openings positioned for alignment with the latch opening of the drawbar, said latch pin being mounted on the top wall and extendible through the top wall opening for engagement with the latch opening of the drawbar and extendible to the latch plate opening.

54. The hitch assembly of claim 53 including: a guide unit mounted on the first vehicle in longitudinal alignment with the latch assembly for guiding the rearward portion of the drawbar towards the latched position.

* * * * *